United States Patent
Robichaud

[11] 3,848,486
[45] Nov. 19, 1974

[54] ADJUSTABLE TOOLHOLDER

[76] Inventor: Edmund J. Robichaud, 1813 Stanley St., New Britain, Conn. 06053

[22] Filed: Dec. 20, 1973

[21] Appl. No.: 426,445

[52] U.S. Cl................................................. 82/36 R
[51] Int. Cl............................................ B23b 29/10
[58] Field of Search................................ 82/36 R, 37

[56] References Cited
UNITED STATES PATENTS

| | | | |
|---|---|---|---|
| 3,283,626 | 11/1966 | Alvey et al............................ | 82/36 R |
| 3,296,904 | 1/1967 | Bullard................................ | 82/36 R |

*Primary Examiner*—Leonidas Vlachos
*Attorney, Agent, or Firm*—Prutzman, Hayes, Kalb & Chilton

[57] ABSTRACT

A toolholder operating bar is pivotally mounted on a machine base and has a swinging end at which an adjustment device is mounted for pivoting the operating bar in opposite angular directions. A driving connection between the operating bar and toolholder is provided by a drive pin fixed to the operating bar between its swinging end and pivot connection to the machine base. The operating bar drive pin to the toolholder overlies cooperating guide means provided by the toolholder and machine base to constrain the toolholder for solely rectilinear movement in a selected direction laterally of an adjustment axis of the toolholder responsive to actuation of the operating bar.

12 Claims, 3 Drawing Figures

PATENTED NOV 19 1974      3,848,486

ADJUSTABLE TOOLHOLDER

This invention generally relates to holders for cutting tools and specifically concerns an adjustable toolholder particularly suited for use with machine tools.

A primary object of this invention is to provide an improved adjustable toolholder particularly suited for laterally moving a cutting tool in a line precisely perpendicular to an adjustment axis of the toolholder.

Another object of this invention is to provide such a toolholder of a pivot adjustment type having an operating bar which is adjustable in relation to a fulcrum and which maintains a preselected lever ratio between an adjustment device acting on the operating bar and a drive pin thereof relative to the fulcrum, regardless of the location of the cutting tool.

A further object of this invention is to provide such a toolholder which is of rugged construction, is economical to manufacture and assemble and which provides quick and easy adjustment during machine setup.

Other objects will be in part obvious and in part pointed out in more detail hereinafter.

A better understanding of the objects, advantages, features, properties and relationships of the invention will be obtained from the following detailed description and accompanying drawings which set forth an illustrative embodiment and is indicative of the way in which the principle of the invention is employed.

In the drawing:

FIG. 3 is a isometric view, partly broken away and partly in section, showing certain toolholder components in partly exploded disassembly for clarity of illustration.

Figure 1:
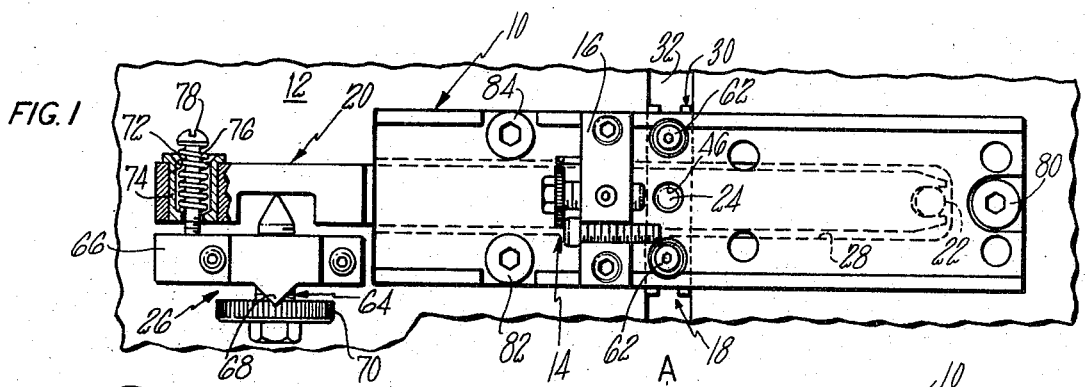
FIG. 1 is a plan view, partly broken away and partly in section, showing an adjustable toolholder incorporating this invention.

Referring to the drawing in detail, an elongated adjustable toolholder 10 is illustrated for holding a cutting tool, not shown, on a support or machine base 12 for performing a cutting operation on a workpiece, not shown. Toolholders of the illustrated type are particularly suited for holding cutting tools on a forward end portion of the toolholder 10 (which is on the right hand side as viewed in FIG. 1) to extend outwardly therefrom along the longitudinal axis or adjustment axis Y—Y for generating a desired surface on a workpiece positioned by the machine on which toolholder 10 is mounted.

It is desired that the machine operator be able to selectively adjust the toolholder to provide fine adjustment for the cutting tool. Such adjustment not only includes adjustment of the cutting tool parallel to the adjustment axis Y—Y of the toolholder 10 by adjustment means 14 toward and away from pusher block 16 of the toolholder but more particularly, accurate lateral adjustment transversely of the adjustment axis Y—Y of toolholder 10 to obtain the highly desired but frequently unobtained preciseness of adjustment required for accurate cutting operations.

As for lateral adjustment, toolholder 10 of this invention is positively limited to rectilinear movement laterally of its adjustment axis Y—Y. In the specifically illustrated embodiment of this invention, a key and guideway arrangement 18 is provided between toolholder 10 and machine base 12 which limits toolholder 10 to captured movement solely in a lateral direction responsive to an actuating movement of an operating bar 20 relative to a pivot pin 22 fixed to machine base 12. This pivot connection between base 12 and bar 20, and a drive connection 24 between bar 20 and toolholder 10, are so designed in the tool-holder of this invention that a 2.5 lever ratio is always maintained between the point of engagement of an adjustment device 26 on a swinging end of bar 20 and its drive connection 24 to the toolholder relative to pivot pin 22. Such construction ensures the desired precision adjustment of a cutting tool laterally of toolholder 10.

More specifically, toolholder 10 has a longitudinally extending bottom channel 28 which receives a forward pivotable end of bar 20. The pviotable end of bar 20 is shown bifurcated to be fitted about pivot pin 22. Operating bar 20 extends through channel 28 from pin 22 toward the exposed rear swinging end of bar 20 with which adjustment device 26 is engaged. Intermediate the ends of bar 20 is a key 30 secured within a slot 32 in machine base 12.

Key 30 is shown projecting above the plane of machine base 12 for receipt in a conforming guideway 34 of toolholder 10. In the specific illustrated embodiment, clearance between guideway 34 and key 30 is minimal to constrain movement of toolholder 10 to solely a linear path of travel in lateral relation to its adjustment axis Y—Y with longitudinally extending front and rear faces 36 and 38 of key 30 serving as guide surfaces for engaging the walls 40 and 42 formed by the toolholder guidway 34. Operating bar 20 has a bottom groove 44 which may be of enlarged size relative to key 30 to permit bar 20 to be pivoted about pivot pin 22 without interference with key 30 while at the same time permitting bar 20 to remain in sliding engagement preferably with both an upper surface of machine base 12 and key 30 during toolholder adjustment.

Toolholder adjustment is effected by drive pin 24 fixed to bar 20 to protrude upwardly into an opening 46 in toolholder 10 to provide the driving connection. For optimum precision lateral adjustment of toolholder 10, drive pin 24 is located in bar 20 in overlying relation to key 30 with the axes of pins 22 and 24 aligned along the longitudinal axis X—X of bar 20 with the point at which an actuating force is applied by adjustment device 26 to move bar 20. The pivot and drive connections 22 and 24 of bar 20 are so designed that relative angular movement of bar 20 responsive to a force applied by adjustment device 26 effects a corresponding rectilinear movement of drive pin 24 along line A—A as established by the cooperating guide means 18 to drive toolholder in a precisely linear direction transversely of its adjustment axis Y—Y.

To maintain toolholder 10 in place during adjustment, a pair of pivoting compression spring means 48, 48 are provided to urge toolholder 10 toward base 12 and to maintain toolholder 10 in sliding engagement with machine base 12. Key 30 is shown having cut-outs 50, 50 at opposite longitudinal ends of the key 30 with an internally threaded rod end portion 52, 52 pivotally mounted within each cut-out 50, 50 for pivotal movement about an axis extending parallel to adjustment axis Y—Y of toolholder 10. Each of the rod end portions 52, 52 is received within an over-sized opening 54, 54 formed on opposite sides of drive pin opening 46 of toolholder 10. Each of the openings 54, 54 provides a spring chamber wherein a bottom end wall such as at 56 of each opening 54, 54 serves as a seat for one end of a compression spring 58, 58 coiled about its rod end portion 52, 52. The opposite end of each compression spring 58, 58 seats against a washer 60, 60 fitted about a shank of machine screw 62, 62 threadably connected to its respective rod end portion 52, 52. By this arrangement, an adjustable compressive force can be maintained on toolholder 10 urging it into sliding engagement on the upper surface of the illustrated machine base 12 for maintaining continuous control of the assembly during adjustment.

Figure 2:
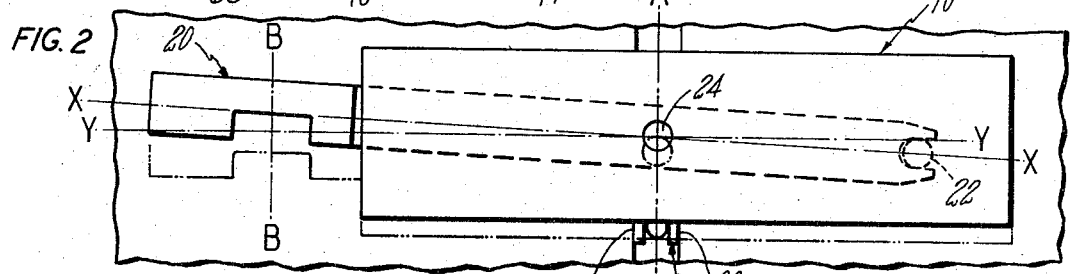
Figure 3:
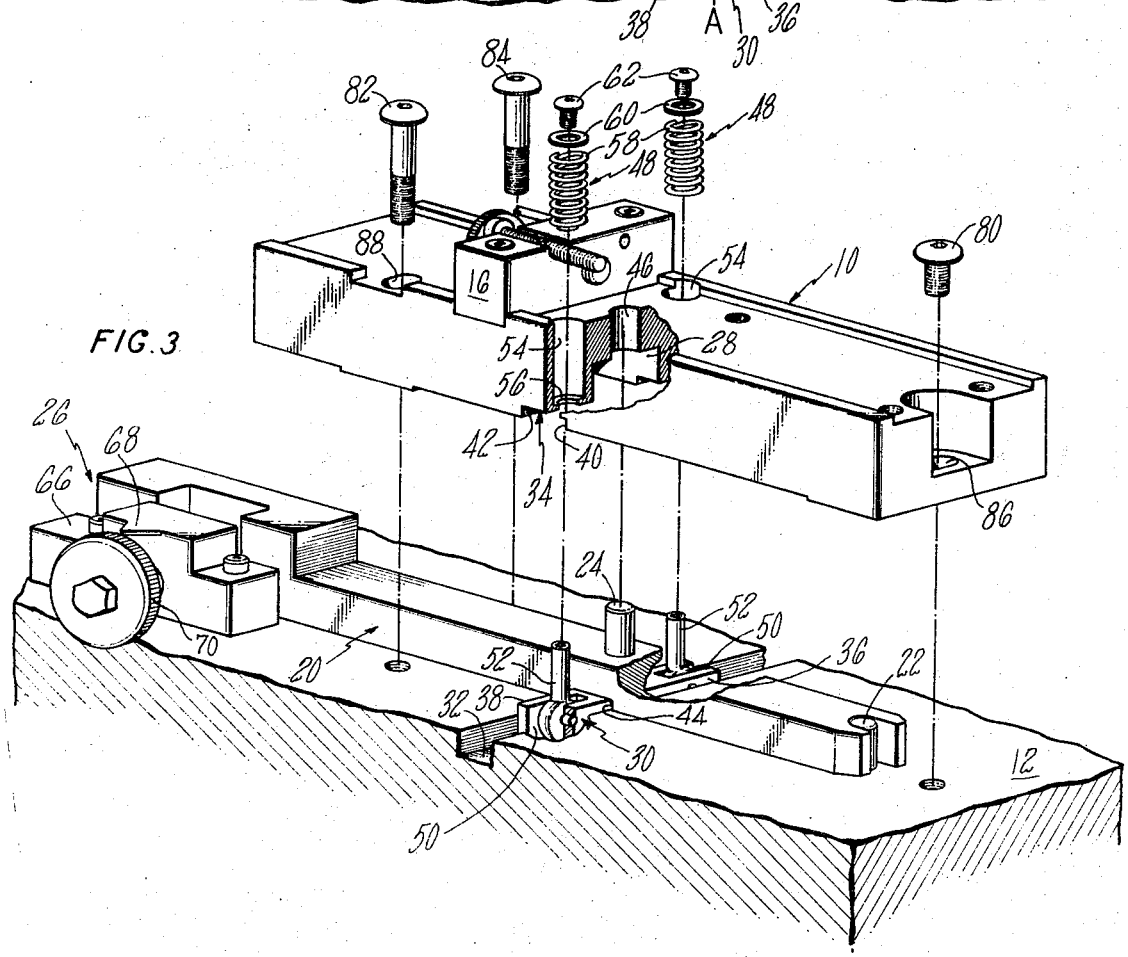
FIG. 3 is a plan view, partly broken away, diagrammatically illustrating movement of the toolholder from a broken line "zero" position to a full line adjusted position.

Adjustment device 26 at the swinging end of bar 20 features an adjustment screw 64 threadably connected to a mounting block 66 fixed to machine base 12 in parallel relation to toolholder axis Y—Y to engage bar 20 along its axis X—X. Screw 64 has a preselected pitch to effect a predetermined linear displacement of the screw 64 and bar 20 along line B—B responsive to a given angular movement of screw 64 as determined by an indicator 68 fixed to block 66, the bar 20 being biased by an adjustable spring load into contact with the engagement end of the screw 64. As an example, if screw 64 is provided with a 40 pitch thread and an adjustment knob 70 having 100 equally spaced calibration marks on its periphery, 0.0001 inch lateral movement of the drive pin 24 and toolholder 10 along line A—A is effected for each calibration mark when the lever arm ratio between the engagement point of the adjustment device 26 with bar 20 and the drive pin 24 relative to the pivot pin 22 is maintained at 2.5 to 1. The direction of lateral displacement of the toolholder obviously depends on the direction of rotation of knob 70, whereby the toolholder 10 may be displaced in opposite lateral directions from its broken line zero position (FIG. 2) by rotating knob 70 in opposite angular directions.

Adjustment device 26 has an over-sized opening 72 formed in bar 20 fitted with a suitable bushing 74 for receiving a spring 76 which seats at one end against a reduced end portion of bushing 74 with the opposite end of the spring 76 seated against a heat of a machine screw 78 extending through the bar 20 and threadably engaged with mounting block 66 on the machine base 12. By this construction bar 20 is continuously biased toward block 66 of base 12 to maintain adjustment screw 64 in engagement with the bar 20 in adjusted position and additionally provides the desired function of minimizing thread backlash in screw 64. Obviously other arrangement could be provided, e.g., wherein the block 66 is located on an opposite side of the operating bar 20 which may be modified such that screws 64 and 78 are operatively mounted in reverse relation to that illustrated in the drawing. Such an arrangement may be desired when a considerable extent of movement in a downward direction as viewed in FIG. 1 is desired and the force of the cutting tool is normally tending to drive the toolholder 10, say, clockwise about its drive pin 24 as seen in FIG. 1.

By virtue of the above described construction, the operating bar 20 will serve to actuate toolholder 10 in a straight line lateral direction relative to its adjustment axis Y—Y to precisely control adjusting movement of the toolholder 10. "Hold down" machine screws 80, 82 and 84 are loosened to permit toolholder adjustment, whereby toolholder movement is permitted by elongated oversized openings for these screws such as shown at 86 and 88, while compression springs 58, 58 continue to maintain toolholder 10 in engagement with machine base 12. Once toolholder 10 is laterally positioned in an adjusted location, the hold down screws 80, 82 and 84 are then tightened to retain toolholder 10 in adjustment relative to machine base 12. If desired, suitable dial indicator means, not shown, may be utilized to provide a visual read-out of the lateral adjustment in a conventional manner, as well as the longitudinal adjustment of a cutting tool held by toolholder 10 effected by adjustment means 14.

The disclosed toolholder is of a simplified rugged construction to effect accurate adjustment during tooling setup which is both fast and simple. In addition, the disclosed key 30 and guideway arrangement 18 serves as a positive stop to minimize undesired longitudinal movement of toolholder 10 and to positively locate the toolholder in locked adjusted position during a machine operation.

As will be apparent to persons skilled in the art, various modifications, adaptations and variations of the foregoing specific disclosure can be made without departing from the teachings of the present invention.

I claim:

1. A toolholder assembly comprising a support, a toolholder mounted for movement on the support relative to an adjustment axis of the toolholder, the support and toolholder having cooperating guide means limiting toolholder movement to rectilinear motion on the support transversely of the adjustment axis of the toolholder, an operating bar having a pivot connection to the support and a drive connection to the toolholder for moving the toolholder in a selected linear direction laterally of the toolholder and its adjustment axis, and an adjustment device for actuating the operating bar, the pivot and drive connections of the operating bar permitting angular movement of the operating bar to effect precision lateral movement of the toolholder transversely of its adjustment axis as established by the cooperating guide means.

2. The toolholder assembly of claim 1 wherein the cooperating guide means includes a key fixed to one of the support and toolholder members and a guideway formed in the other of the support and toolholder members to extend laterally of the toolholder for receiving the key.

3. The toolholder assembly of claim 2 wherein the key and guideway additionally cooperate to serve as positive stop against undesired movement of the toolholder relative to the support in a direction parallel to the adjustment axis of the toolholder.

4. The toolholder assembly of claim 1 further including a releasable locking means for securing the toolholder to the support in adjusted position.

5. The toolholder assembly of claim 1 wherein the pivot connection includes a pivot pin fixed to the support and serving as a fulcrum for the operating bar, wherein the drive connection includes a drive pin secured to the operating bar at a preselected distance from the pivot pin, the operating bar drive pin being pivotally connected to the toolholder for effecting a following linear movement thereto as established by the guide means responsive to an angular movement of the operating bar about the pivot pin.

6. The toolholder assembly of claim 5 wherein the adjustment device is located adjacent a swinging end of the operating bar with the adjustment device and the support pivot pin located on opposite sides of the guide means.

7. The toolholder assembly of claim 6 wherein the guide means includes a key fixed to the support with a guideway formed in the toolholder for receiving the key, the toolholder has a bottom channel for receiving the operating bar, the operating bar has a bottom groove for receiving the key, the operating bar drive pin is in overlying relation to the key, and wherein the adjustment device engages the operating bar at a point spaced apart from the support pivot pin a distance 2.5 times said preselected distance between the support pivot pin and the operating bar drive pin.

8. The toolholder assembly of claim 7 wherein the point of engagement between the operating bar and the adjustment device is aligned with the axes of the support pivot pin and the operating bar drive pin.

9. The toolholder assembly of claim 1 wherein the adjustment device includes an adjustment screw threadably mounted on the support for engagement with the operating bar, and biasing means urging the operating bar into engagement with the adjustment screw.

10. The toolholder assembly of claim 2 wherein the key is fixed to the support and the guideway is formed in the toolholder.

11. The toolholder assembly of claim 10 further including spring means urging the toolholder toward the support for maintaining the toolholder in sliding engagement with the support during adjustment.

12. The toolholder assembly of claim 11 wherein the spring means includes a compression spring coiled about an adjustable fastener having one end pivotally secured to the key of the support and an opposite end serving as a seat for one end of the spring, the other end of the spring being seated on the toolholder and urging it toward the support.

* * * * *